US008888046B2

United States Patent
Cremers (10) Patent No.: US 8,888,046 B2
(45) Date of Patent: Nov. 18, 2014

(54) FUEL MANAGEMENT SYSTEM

(75) Inventor: Joerg Cremers, Hamburg (DE)

(73) Assignee: Airbus Operations GmbH (DE)

( * ) Notice: Subject to any disclaimer, the term of this patent is extended or adjusted under 35 U.S.C. 154(b) by 848 days.

(21) Appl. No.: 12/564,345

(22) Filed: Sep. 22, 2009

(65) Prior Publication Data

US 2010/0076672 A1 Mar. 25, 2010

Related U.S. Application Data

(60) Provisional application No. 61/192,788, filed on Sep. 22, 2008.

(30) Foreign Application Priority Data

Sep. 22, 2008 (DE) .......................... 10 2008 048 275

(51) Int. Cl.
*G06F 19/00* (2011.01)
*G06G 7/72* (2006.01)

(52) U.S. Cl.
USPC ...................................... 244/134 C; 701/124

(58) Field of Classification Search
USPC ......... 701/1, 3, 4, 5, 8, 15, 16, 36, 45, 54, 93, 701/99, 100, 104, 124; 244/182, 181, 183, 244/75 R, 135 C, 135 R
See application file for complete search history.

(56) References Cited

U.S. PATENT DOCUMENTS

| | | | |
|---|---|---|---|
| 2,992,558 A | 7/1961 | Newell et al. | |
| 3,612,837 A | 10/1971 | Brandau | |
| 4,159,088 A | 6/1979 | Cosley | |
| 4,214,721 A | 7/1980 | Burhans, Jr. et al. | |
| 4,312,041 A | 1/1982 | DeJonge | |
| 4,325,123 A * | 4/1982 | Graham et al. | 701/110 |
| 4,477,040 A | 10/1984 | Karanik | |
| 4,814,993 A | 3/1989 | Zapryanov et al. | |
| 4,856,732 A | 8/1989 | Eickmann | |
| 5,121,325 A * | 6/1992 | DeJonge | 701/123 |
| 5,313,778 A | 5/1994 | Sweet et al. | |
| 5,490,645 A | 2/1996 | Woodhouse | |
| 5,518,330 A | 5/1996 | Gervais et al. | |
| 6,283,410 B1 | 9/2001 | Thompson | |
| 6,298,661 B1 | 10/2001 | Holder et al. | |
| 6,334,344 B1 | 1/2002 | Bonhoure et al. | |

(Continued)

FOREIGN PATENT DOCUMENTS

| | | | |
|---|---|---|---|
| CA | 2360885 A1 | 4/2002 | |
| CA | 2472409 A1 | 12/2004 | |

(Continued)

*Primary Examiner* — Ronnie Mancho
(74) *Attorney, Agent, or Firm* — Lerner, David, Littenberg, Krumholz & Mentlik, LLP (57) ABSTRACT

A computer implemented fuel management method and system for monitoring and minimizing a fuel consumption of an aircraft. The fuel management system and method determines, on the basis of model assumptions, a theoretical value relating to the quantity of fuel that is necessary for travelling along at least one sector of a flight route. Furthermore, the fuel management system and method determine a practical value relating to a quantity of fuel that is necessary for travelling along the same sector of the flight route, taking into account actual measured values. Moreover, the system and method compare the theoretical value with the practical value and to provide at least one measure in order to save fuel during a flight when the practical value differs from the theoretical value by a predeterminable amount.

12 Claims, 2 Drawing Sheets

(56) References Cited

U.S. PATENT DOCUMENTS

| | | | |
|---|---|---|---|
| 6,454,218 B1 | 9/2002 | Jacobson | |
| 6,655,123 B2 | 12/2003 | Blot-Carretero et al. | |
| 6,827,311 B2 | 12/2004 | Wingett et al. | |
| 7,007,897 B2 | 3/2006 | Wingett et al. | |
| 7,078,880 B2 | 7/2006 | Potter et al. | |
| 7,082,767 B2 | 8/2006 | Guillot-Salomon et al. | |
| 7,108,229 B2 | 9/2006 | Hoffjann et al. | |
| 7,285,753 B2 | 10/2007 | Hoehne et al. | |
| 8,226,040 B2 * | 7/2012 | Neto | 244/135 C |
| 2002/0099497 A1 | 7/2002 | Godwin et al. | |
| 2004/0249521 A1 * | 12/2004 | Petersen et al. | 701/3 |
| 2005/0028513 A1 | 2/2005 | Guillot-Salomon et al. | |
| 2006/0174629 A1 | 8/2006 | Michalko | |
| 2007/0084511 A1 | 4/2007 | Johnson et al. | |
| 2009/0112407 A1 * | 4/2009 | Kneller et al. | 701/45 |
| 2010/0100225 A1 * | 4/2010 | Reed et al. | 700/213 |

FOREIGN PATENT DOCUMENTS

| | | |
|---|---|---|
| CA | 2472276 A1 | 2/2005 |
| CN | 1089913 A | 7/1994 |
| CN | 1090544 A | 8/1994 |
| CN | 1556006 A | 12/2004 |
| DE | 3334307 A1 | 4/1984 |
| DE | 3309768 A1 | 9/1984 |
| DE | 4335152 C1 | 4/1995 |
| DE | 19623255 A1 | 12/1996 |
| DE | 19600043 C1 | 4/1997 |
| DE | 19906076 A1 | 8/2000 |
| DE | 69915039 | 9/2004 |
| DE | 103 25 258 A1 | 1/2005 |
| DE | 10356012 A1 | 6/2005 |
| DE | 10360303 A1 | 7/2005 |
| DE | 102004019790 B4 | 11/2005 |
| DE | 602004000178 T2 | 7/2006 |
| EP | 0105410 A1 | 4/1984 |
| EP | 0212619 A2 | 3/1987 |
| EP | 648671 A1 | 4/1995 |
| EP | 953505 A1 | 11/1999 |
| EP | 1505280 A1 | 2/2005 |
| EP | 1897804 A2 | 3/2008 |
| EP | 1963184 A1 | 9/2008 |
| ES | 2253726 | 6/2004 |
| FR | 2846939 A1 | 5/2004 |
| FR | 2858658 A1 | 2/2005 |
| GB | 2127492 A | 4/1984 |
| JP | 8-014216 A | 1/1996 |
| JP | 11040831 A | 2/1999 |
| JP | 2001213398 A | 8/2001 |
| JP | 2005082018 A | 3/2005 |
| JP | 2005112005 A | 4/2005 |
| WO | 0238444 A2 | 5/2002 |
| WO | 2004089741 A1 | 10/2004 |
| WO | 2007/019135 A2 | 2/2007 |
| WO | 2007071909 A1 | 6/2007 |

* cited by examiner

FUEL MANAGEMENT SYSTEM

CROSS-REFERENCE TO RELATED APPLICATIONS

This application claims the benefit of the filing date of U.S. Provisional Patent Application No. 61/192,788 filed Sep. 22, 2008, the disclosure of which is hereby incorporated herein by reference.

BACKGROUND OF THE INVENTION

The present invention relates to a fuel management, in particular a fuel management system for monitoring and minimizing a fuel consumption of an aircraft.

To carry out their missions passenger aircraft require large quantities of aircraft fuel (kerosene). The total weight of the fuel and the fuel system can account for up to 50% of the total weight of the aircraft. Due to strong rises in oil prices over recent times, and due to ever increasing requirements relating to emissions and climate protection, measures for saving fuel are assuming special significance.

Fuel systems are, for example, known from US 2005 028 513, CA 2 472 276, DE 60 2004 000 178, EP 1 505 280, ES 2 253 726, FR 2 858 658, U.S. Pat. No. 7,082,767, and from EP 1 963 184, WO 2007 071 909.

During pre-flight planning, a quantity of aircraft fuel to be taken on board is estimated, which quantity is sufficient assuming normal flight conditions on a flight route to be covered. Such an estimate is based on model assumptions relating to the flight conditions, and furthermore takes into account parameters, which are more or less precisely known, that influence fuel consumption, such parameters being, for example, the total loaded weight of the aircraft etc.

For safety reasons a certain percentage is added as a reserve to this estimated quantity of aircraft fuel in order to have sufficient fuel left in case of unforeseen events or flight conditions, and in this way to increase flight safety. The quantity of reserve fuel to be carried on board is usually predetermined by safety guidelines from the relevant aviation authorities. At present it is considered adequate to carry along 5% of the estimated required fuel quantity in addition as a reserve in order to have an adequate safety margin in every case.

One option for reducing the quantity of aircraft fuel carried on board, and thus also for reducing the weight of the aircraft, consists of reducing the additionally carried quantity of reserve fuel to a lower percentage rate. However, by means of suitable additional measures it must be ensured that the level of flight safety is not reduced as a result of this.

It can thus be considered to be an object of the present invention to provide an improved fuel management system that can make it possible to increase or maintain the safety level, even if the quantity of reserve fuel carried in addition is reduced.

BRIEF SUMMARY OF THE INVENTION

This object can be met by the subject of the present invention according to the independent claims. Advantageous exemplary embodiments of the present invention are described in the dependent claims.

According to a first aspect of the present invention, a fuel management system for monitoring and minimizing a fuel consumption of an aircraft is described. The fuel management system is designed to determine, on the basis of model assumptions, a theoretical value relating to a quantity of fuel that is necessary for travelling along at least one sector of a flight route. Furthermore, the fuel management system is designed to determine a practical value relating to a quantity of fuel that is necessary for travelling along the at least one sector of the flight route, taking into account actual measured values. The fuel management system is designed to compare the theoretical value with the practical value, and to provide at least one measure in order to save fuel during a flight when the practical value differs from the theoretical value by a predeterminable amount.

In other words, the idea of the present invention according to the first aspect is based on a comparison of a theoretically calculated value of a quantity of fuel or the fuel consumption for a particular flight sector during a flight with a value that has been more precisely determined by measuring. The calculation in advance, the determination and the comparison are carried out by a fuel management system. If the comparison shows that the two values differ by a certain amount, the system can propose or initiate measures for saving fuel. For example, if the actually measured value relating to the fuel consumption is larger than, for example, the value theoretically determined prior to flight or during the flight, in relation to the actually traveled sector of a flight route, then the system can, for example, cause a reduction in the flight speed in order to save fuel in this way.

In this way it can be ensured that even when the actual fuel consumption, e.g. due to unforeseen flight conditions, were to be higher than previously theoretically assumed during refuelling, flight safety is not impeded because the fuel management system can detect this during the flight and can propose or initiate corresponding fuel-saving measures which may, for example, have a negative effect on passenger convenience, but not on flight safety. Due to the additional safeguards provided by the fuel management system proposed in the present document, the quantity of reserve fuel to be carried on board can be reduced. This can lead to a reduction in the total loaded weight and thus to significant cost savings.

Below, characteristics, details and possible advantages of a fuel management system according to the first aspect of the invention are described in detail.

Present-day aircraft which, for example, comprise an FMGS (Flight Management and Guidance System) and an APM (Aircraft Performance Monitoring) function can be retrofitted with the fuel management system. As an alternative, new aircraft can be equipped with the fuel management system.

The fuel management system can comprise several sub-units. For example, a unit of the fuel management system can be responsible for determining and/or calculating the theoretical value of the quantity of fuel. This unit can, for example, comprise a processor with user interaction interfaces. This means, a user can, for example, enter data and/or model algorithms by way of a keyboard and/or mouse, on the basis of which data and/or model algorithms a theoretical value relating to the required quantity of fuel can be determined. The sub-units of the fuel management system can, furthermore, communicate and exchange data with each other wirelessly and/or by way of cables. The sub-units can comprise sensors that can be used for determining measured values.

For example, a sub-unit of the fuel management system, which sub-unit is responsible for determining a practical actual value of the quantity of fuel remaining in the tanks, can be connected to at least one sensor that determines the quantity of fuel and forwards information relating to it.

The fuel management system can communicate with further systems of the aircraft. For example, the fuel management system can communicate with a display medium, for example a computer monitor, and can indicate to the aircrew that measures for saving fuel need to be initiated. Furthermore, the fuel management system can display a selection of measures that in the actual situation are suitable for saving fuel. Furthermore, the fuel management system can communicate with systems such as the air conditioning system of the aircraft, with the galley and/or with the in-flight entertainment system in order to reduce, when necessary, the energy consumption of one or several systems, thus saving fuel.

For example during pre-flight planning, a theoretical value relating to a quantity of fuel to be carried on board can be determined by the fuel management system. This value can, for example, be based on the theoretically determined fuel consumption relating to the entire flight route. For example, the theoretical determination is merely based on model assumptions; as an alternative, certain measured values taken at the time could also be incorporated in the calculation. Furthermore, the theoretical value may be able to be read from tables for particular flight conditions and flight route sectors. The flight route can comprise several flight sectors. The sectors can, for example, be characterised by a distance and/or the type of flight, for example takeoff, ascent phase and approach to land.

Several factors can influence the fuel consumption of the aircraft. The model assumptions that are incorporated in the calculation of the theoretical value relating to a quantity of fuel to be carried on board can, for example, refer to particular meteorological conditions, for example wind conditions. Furthermore, model assumptions can contain functions concerning the interrelationships between time-related flight costs, fuel-related flight costs and the flight speed, or can be based on cost-benefit calculations.

The practical value, determined by the fuel management system, of the quantity of fuel that is necessary for travelling along a particular sector of the flight route, for example of the remaining flight distance, is determined based on values actually measured at the time. The measuring values actually determined at the time can, for example, relate to a quantity of fuel present on board at a given time of the flight, and/or to a true actual fuel consumption. These values can, for example, be measured by way of sensors in the fuel tank or in the fuel lines, respectively.

The fuel management system compares the theoretical value with the practical value, for example by generating differences and possibly absolute values. For example, if the practically measured value of a fuel consumption during takeoff is greater than the theoretically determined value relating to the takeoff sector, then the fuel management system can advise the aircrew, by means of a signal, about the need to initiate measures for saving fuel.

The amount by which the practical value may differ from the theoretical value before measures for saving fuel are initiated can, for example, be set by the flight crew during pre-flight planning or during the flight, or due to safety guidelines the aforesaid can have been preset.

Furthermore, the fuel management system can provide these measures for saving fuel. A list of suitable measures can be transmitted to the aircrew and can, for example, be displayed on a monitor in the cockpit. As an alternative, the fuel management system can select and implement one or several measures automatically, for example according to a previously entered list of priorities. Such measures can, for example, relate to a reduction in the cruising speed and/or to energy saving measures in on-board systems such as the galley or the in-flight entertainment system.

As a result of continuous or sector-based monitoring of the fuel consumption or of the existing quantity of fuel and the comparison with predetermined values by the fuel management system, fuel consumption can be reduced if necessary, and in this way flight safety can be enhanced.

For example, a fuel reserve that has to be carried on board and that is prescribed by guidelines or directives can, for example, be reduced from 5% to 3% of the fuel for the overall flight route. In this arrangement the level of flight safety is improved or at least retained by the high degree of reliability and plausibility provided by the fuel management system according to the invention. By optimising the quantity of fuel to be carried on board, for example by a reduction in the fuel reserve, it is possible to save both weigh and fuel, and at the same time flight costs can also be reduced with it.

An increase in flight safety is also reflected in that in the case of a fault or malfunction, too, for example a leak in the fuel system, additional options for reducing fuel consumption are provided.

According to one embodiment of the present invention, the actually determined measuring values comprise at least one measured value from the following group: a quantity of fuel that is actually present on board at the time, and the actual fuel consumption at the time.

In order to determine the quantity of fuel that is actually present on board at the time, i.e. the practical value, different measured values can be used. The quantity of fuel that is actually present on board can be determined directly, for example, by way of fill level sensors in the fuel tanks.

As an alternative, an actual fuel consumption at the time can be continuously determined by way of sensors and can be stored. Subsequently, at a predetermined point in time, from the data relating to the quantity of fuel initially taken on board or carried along, and from the determined fuel consumption, the quantity of fuel that actually remains in the fuel tanks at the time can be calculated.

Determining the quantity of fuel that is actually present on board at the time can, for example, also be applied in addition to determining the actual fuel consumption in order to verify this measured value. In this way the accuracy of the practical value relating to the quantity of fuel can be increased.

According to a further embodiment of the present invention, providing the at least one measure for saving fuel during a flight involves generating a signal. The signal is transmitted to an aircrew. In this arrangement the signal lists proposals of at least one measure in order to save fuel during the flight.

The signal, which is transmitted to the aircrew, can be an acoustic and/or a visual signal. The measures listed can, for example, be presented on a display. The measures can be listed as different alternatives for saving fuel, and/or can be proposed as a system economy mode which, for example, places several defined on-board systems into an operating state which saves fuel when compared to the normal operating state.

The fuel management system can thus generate a signal that provides alternative measures and/or groups of measures. Grouping several measures can, for example, save the aircrew time in selecting suitable measures, which can be advantageous above all in emergency situations.

According to a further embodiment of the present invention, the at least one measure for saving fuel during a flight comprises at least one measure from the following group: optimisation of flight parameters; reduction in the energy consumption of at least one on-board system; and transfer pumping fuel in order to optimise the center of gravity of the aircraft.

The optimisation of flight parameters may be one measure for saving fuel during a flight. The largest saving potential during a flight can relate to a reduction in the cruising speed because the aerodynamic resistance and thus also the fuel consumption increases proportionally to the square of the speed (not taking into account special effects). Further optimisation of flight parameters can, for example, relate to a more direct travel path or to other flight altitudes. For reasons of safety, any changes in these parameters may have to be cleared with flight control.

Fuel savings can also be achieved by transfer pumping fuel in order to optimise the center of gravity of the aircraft. From flight physics it is known that in most aircraft configurations the center of gravity CG should be as far back as possible, wherein stability limits have to be taken into account.

A further measure can relate to reducing an energy consumption of at least one on-board system. There is a possibility of saving energy on board in that consumers of thermal or electrical energy, which consumers are not safety-relevant, are either switched off or operated in economy mode.

An example of the above is the environmental control system (ECS) in which, for example, a package can be switched off or the percentage of recirculated air can be increased, a slight increase in temperature is temporarily accepted, etc. Furthermore, the galleys, the floor heating system, parts of the cabin illumination system and the entertainment system can also contribute to a reduction in electricity consumption.

For example, the following systems can be operated in economy mode: the bleed system, air conditioning system, on-board galleys, electrically operated seats, entertainment systems, part of the cabin illumination, floor heating, fuel-system inerting systems, convenience systems such as light, for example dimmable window illumination, humidification, as well as oxygen enrichment and water filtration. The air conditioning system can, for example, be designed in such a way that one or several of the following savings measures can be carried out: changing the cabin pressure; changing the average temperature and/or the tolerances to temperature differences; changing the degree of humidity in the cabin; changing the recirculation rate, if appropriate in combination with carbon dioxide filtration measures. In this context a certain operating state of the on-board systems can be calculated, which operating state is required in order to operate the air conditioning system in economy mode.

Under certain circumstances it may be sensible to subsume some economy measures in one function so as to achieve a certain energy consumption state. For example, by means of additional functions of the fuel management system, certain system groups of on-board systems can be operated in an energy saving mode, and this information can be handed onto other relevant on-board systems. For example, a combined reduction in the power used for various consumers, which reduction considered in isolation in relation to each consumer does not result in a significant decrease in convenience, overall can lead to a situation in which much less heat has to be removed so that the ECS can be operated in economy mode.

For example in future aircraft, in particular, switching off systems that provide increased convenience, and operating such systems in economy mode can be considered, for example switching off an air humidification plant and/or a freshwater conditioning plant, temporarily switching off a fuel-system inerting system, switching off electrically operated window darkening systems, switching off oxygen enrichment systems, etc.

An additional measure to save fuel can consist of the use of a thermoelectric generator that is integrated in the fuel management system or that is connected to it. To this effect the generator can be equipped to use the waste heat of the aircraft systems in order to convert heat to electrical energy and if applicable feed this energy to on-board systems that require such energy.

According to a further embodiment of the present invention, the fuel management system is designed to determine the center of gravity of the aircraft. The center of gravity that has been determined is used in determining the theoretical value of a quantity of fuel that is necessary for travelling along at least one sector of a flight route. During the determination of the center of gravity at least one of the following characteristics is taken into account: number, distribution and weight of objects in the aircraft.

The transfer pumping of fuel can be all the more effective the more precisely the actual center of gravity is known, which center of gravity can in turn depend on short-term loading of objects (essentially passengers and/or freight). Furthermore, the energy consumption of certain systems on board can depend on loading, for example the required electrical and thermal energy (galley, air conditioning system). Since the required electrical and thermal energy is taken from the engines (bleed system, generator), consumption can have a direct influence on the fuel quantity used.

It is therefore advantageous to provide a system by means of which loading and distribution of passengers or objects can be precisely determined and this data can be provided to the data system of the aircraft or to the fuel management system in order to on the one hand calculate the center of gravity as precisely as possible, and on the other hand in addition to optimise the energy consumption of the on-board systems.

The center of gravity that has been determined is used in determining the theoretical value of the quantity of fuel. The more precisely the center of gravity can be determined, the more precisely the theoretical value can be determined. In other words, with increased accuracy in the determination of the center of gravity, the quantity of fuel that is to be carried on board in addition as a reserve can be reduced without incurring any reduction in flight safety.

According to a further embodiment of the present invention, the fuel management system is designed to determine the characteristic of distribution of the objects in the aircraft by signal transmission during a fastening of seat belts.

When determining the center of gravity it may be advantageous to access information provided by already existing aircraft systems. For example, by means of a system that is responsible for monitoring a fasten-seatbelt function, at the same time the seat distribution of passengers can be acquired both geometrically and quantitatively.

According to a further embodiment of the present invention, the fuel management system is designed to determine the characteristic of the weight of the objects by means of sensors that are integrated in aircraft seats.

The distribution of the weight of the passengers can be determined even more precisely than is possible by way of the fasten-seatbelt function, for example by means of a pressure sensor that is integrated in the seat. This information can then be used with information from other systems, for example the weight data of a nose undercarriage or of a main undercarriage, for precise determination of the center of gravity.

According to a further embodiment of the present invention, the fuel management system is designed to determine at least one of the characteristics of the weight and of the distribution of the objects by way of RFID tags arranged on the objects.

By means of radio frequency identification (RFID) technology it is possible to determine the weight distribution of the loaded cargo. To this effect the weight, for example of a container, can be stored on an RFID tag or a chip. Such RFID tags can be affixed to the individual objects, for example containers. The information stored on the RFID tags can then be read-out from a cargo load system of the aircraft. For example, by means of the signal transit time and the signal direction it is possible to determine the location, in the cargo space, of a container with an RFID tag.

In addition, the weight information provided by the undercarriage units can be used to determine the center of gravity and the weight.

The data determined in this manner can then be made available both to the fuel management system (FMGS) and the energy-consuming on-board systems. Information about the payload objects can furthermore be provided to any of the systems in the aircraft that are relevant to optimising fuel consumption, and can be used in a suitable manner by these systems in order to reduce fuel consumption by adaptation to the payload.

According to a further embodiment of the present invention, the at least one measure to save fuel during flight uses data relating to the determined center of gravity of the aircraft in order to optimise the center of gravity of the aircraft by transfer pumping fuel.

According to a second aspect of the present invention, a method for monitoring and minimizing the fuel consumption during the flight of an aircraft is described. The method comprises the following steps: determining a theoretical value relating to the fuel quantity that is necessary for travelling along at least one sector of a flight route, based on model assumptions; determining a practical value relating to a quantity of fuel that is necessary for travelling along the at least one sector of the flight route, taking into account actual measured values; comparing the theoretical value with the practical value; and providing at least one measure to save fuel during the flight when the practical value differs from the theoretical value by a predeterminable amount.

According to a third aspect of the present invention, an aircraft is described. In this arrangement the aircraft comprises the system described above according to the first aspect of the present invention.

According to a fourth aspect of the present invention, a computer program element is described. The computer program element is designed to implement the method described above according to the second aspect of the present invention when it is executed on a processor.

According to a fifth aspect of the present invention, a computer-readable medium is described. In this arrangement the program element according to the fourth aspect of the present invention is stored on the medium.

Further characteristics and advantages of the present invention are evident to the average person skilled in the art from the following description of exemplary embodiments, which are, however, not to be interpreted as limiting the invention, with reference to the accompanying drawings.

BRIEF DESCRIPTION OF THE DRAWINGS

All the figures are merely diagrammatic representations of fuel management systems according to the invention or of their components and the corresponding methods. In the various figures the same reference characters are used for identical or similar elements.

DETAILED DESCRIPTION

Figure 1:
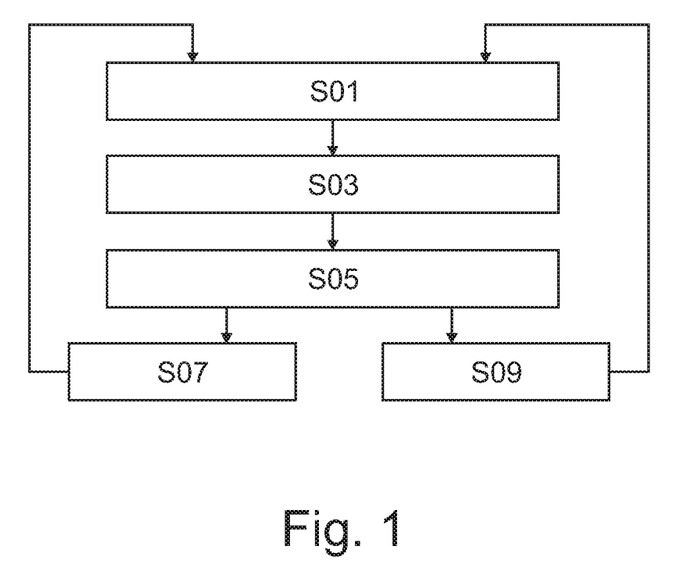
FIG. 1 diagrammatically shows a method according to the invention for monitoring and minimizing the fuel consumption during the flight of an aircraft.

FIG. 1 shows an embodiment of the method according to the invention for monitoring and minimizing the fuel consumption during the flight of an aircraft. At first, for example during the flight or even already within the context of pre-flight planning, a theoretical value relating to the quantity of fuel that is necessary for travelling along at least one sector of a flight route is determined on the basis of model assumptions (step S 01). At the same time or subsequently, a practical value relating to a quantity of fuel that is necessary for travelling along the same sector of the flight route is determined. In this process actually measured values are taken into account (step S 03). After determination of the theoretical value and of the practical value, both values are compared by generating the difference (step S 05). If both values agree or differ only slightly, i.e. if the difference does not exceed a predetermined amount, no special measures are initiated (step S 07). However, if the practical value differs from the theoretical value by a predeterminable amount, at least one measure is provided to save fuel during the flight (step S 09). The method can be repeated continuously during the entire flight or at certain intervals.

Figure 2:
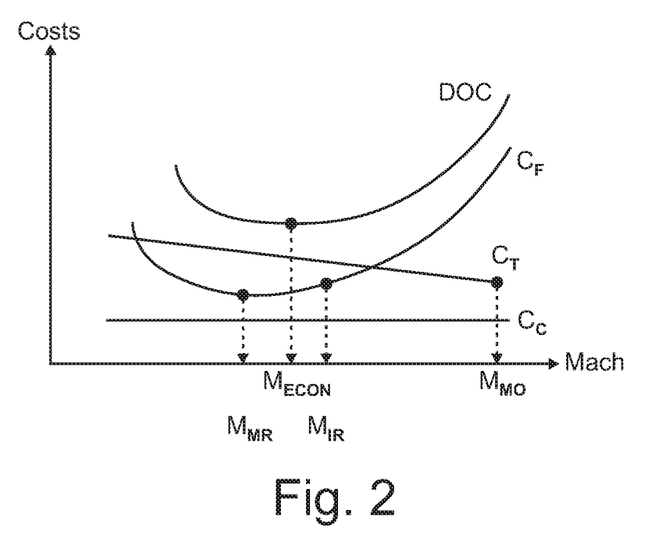
FIG. 2 shows a schematically graph of a function to determine the optimum cruising speed by means of a direct-operating-costs (DOC) flight cost function.

FIG. 2 shows a diagrammatic graph of a function to determine the optimal cruising speed by means of the DOC (Direct Operating Costs) flight cost function. After a so-called cost index (CI)

$$CI = \frac{C_T}{C_F}$$

has been entered by the aircrew, this graph shows the optimum cruising speed $M_{ECON}$. The abscissa shows the cruising speed in Mach. The ordinate shows the flight costs.

As described above, the flight cost function DOC depends on the time-related flight costs $C_T$ (time-related costs per flight hour) and on the fuel-related flight costs $C_F$ (cost of fuel unit) as follows:

$$DOC = C_C + C_F \Delta F + C_T \Delta T$$

wherein $C_C$ denotes the fixed costs, $\Delta F$ (trip fuel) denotes the theoretically determined total quantity of fuel, and $\Delta T$ (trip time) denotes the flight duration. Fuel-optimised management of the flight can, for example, be carried out automatically by the FMGS. As part of this, balancing of the flight duration saved as a result of increased flight speed, and the increased fuel consumption due to the increased flight speed, as well as the associated costs can take place. The theoretical value relating to a quantity of fuel that is used for the entire flight distance, i.e. the value relating to the quantity of the fuel to be taken on board, is as a rule determined in such a way that the flight costs are minimized.

For example, the quantity of fuel Q to be carried on board can be calculated as follows:

$$Q = TxF + TF + CF + AF + FRF + AddF + XF$$

wherein:
- TxF=fuel for taxiing
- TF=fuel for the flight route (takeoff, ascent phase, cruise, approach to land, landing, i.e. trip fuel)
- CF=contingency fuel
- AF=alternative fuel
- FRF=final reserve fuel
- AddF=additional fuel
- XF=extra fuel Contingency fuel can refer to the greater of the following quantities:
- quantity of fuel necessary for flying for 5 minutes at an altitude of 1500 ft (approx. 500 m) at a certain speed (holding speed) above the destination airport under ISA (International Standard Atmosphere) conditions, or one of the following quantities:
- 5% TF
- 3% TF with a suitable diversion airport along the route (requires approval)
- 15 minutes flight duration at an altitude of 1500 ft (approx. 500 m) at a certain speed (holding speed) above the destination airport under ISA conditions (requires approval; as well as a system for fuel consumption monitoring)
- 20 minutes flight at cruising conditions, provided the aircraft operator has a fuel consumption monitoring program that is individually tailored to the aircraft to be operated; as well as the use of the resulting data for determining the fuel requirement (requires approval).

This calculation must not, for example, be applied to ETOPS (Extended Twin Engine Operations) aircraft. In such a case the fuel reserves to be carried on board need to be greater.

In the context of saving fuel during a flight, one of the measures offering the greatest savings potential consists of reducing the cruising speed, because the aerodynamic resistance and thus also the fuel consumption increases proportionally to the square of speed. Possible limits in the reduction of the cruising speed and the resulting effects, for example on flight costs, are provided in the graph of FIG. 2.

Further possible measures for saving fuel, which measures can be provided by the fuel management system, include, for example, those mentioned below. During the takeoff phase and initial ascent phase: low settings of bleed ports, doing without flight planning according to noise emission, and doing without flexible thrust. During the ascent phase: according to the law of optimal ascent, if at all possible no excessive ascent speeds; during the cruising phase (cruising altitude): low cruising speed, steep ascent to optimal flight altitude, use of optimal flight altitude, taking into account changes in wind, etc. During the descent phase: low descent speed, avoid early initiation of descent. During the landing phase: avoid early extension of the landing gear units.

The measures for saving fuel are supported by on-board flight systems, normally by an FMS (Flight Management System) both during pre-flight planning and during the flight.

Fuel-saving measures that can already be initiated prior to takeoff of the aircraft include, for example: careful flight planning using data (weather etc.) that is as up-to-date as possible; correct loading of the aircraft; selecting the flight procedures in accordance with the priorities of the airline concerned; using the FMGS in automatic mode; as far as possible using ground-based equipment (electricity, air, etc.); using aircraft performance factors for flight planning, which factors originate from a corresponding performance monitoring program of the aircraft; checking the aerodynamic "cleanness" of the aircraft; and taxiing out with the use of one engine only.

These measures and the ones mentioned above can be supported by an improved design of the aircraft fuel system. This should make it possible to precisely determine the quantity of fuel, e.g. better than 1%, wherein the probability of inaccuracies in determining the quantity of fuel must not exceed certain levels, depending on the size of the difference. These limits can, for example, be determined in negotiations with the authorities in order to be able to agree to a reduction in the quantity of fuel carried on board.

Figure 3:
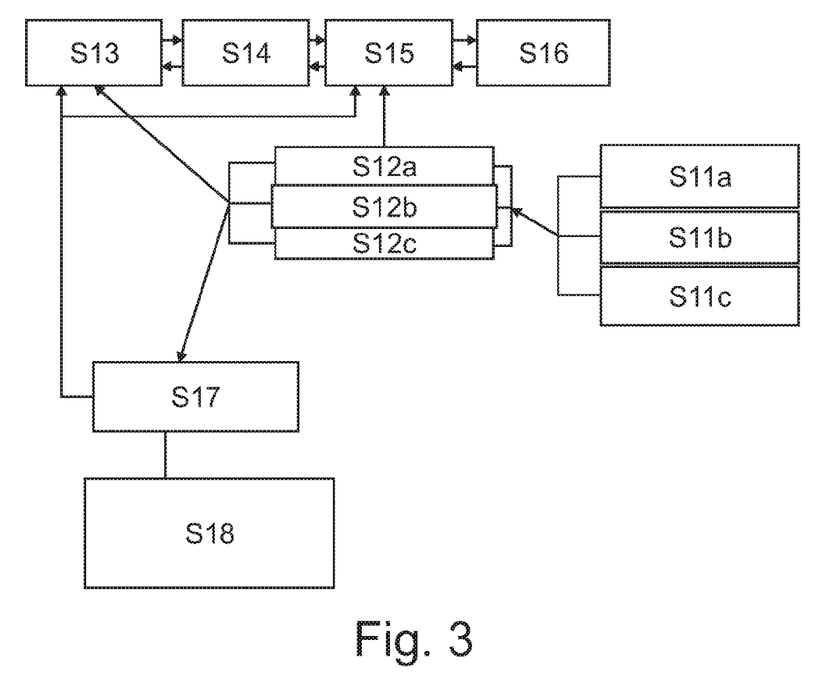
FIG. 3 diagrammatically shows a method for center of gravity optimisation and system configuration by precisely determining the payload weight and the payload distribution, which method can be used in a fuel management system according to the invention.

FIG. 3 diagrammatically shows a method for center-of-gravity optimisation and system configuration by precise determination of the payload weight and the payload distribution, which method can be used in a fuel management system according to the invention.

By way of various sensors, it is possible to determine data relating to the number, distribution and the weight of the passengers (step S $11a$) and of the load or the cargo (step S $11b$) of the aircraft. Moreover, further weight data relating to the weight acting on the wheels or the landing gear units (step S $11c$) of the aircraft can be determined. For example, the weight acting on the nose landing gear, the main landing gear, and if applicable the landing gear units on the left-hand side, right-hand side and in the middle can be measured.

By means of this data that has been determined, the fuel management system can determine a load distribution (step S $12a$), can carry out center of gravity determination (step S $12b$) and determine the total weight (step S $12c$).

The information determined in steps S $12a$ to S $12c$ is used in the advance calculation of the theoretical value relating to the fuel consumption or to the required quantity of fuel (step S 13). Furthermore, this information is used for the configuration of on-board systems, for example the electricity consumption in the cabin (step S 17). Moreover, this information is used in the introduction of measures for saving fuel by means of the fuel management system (step S 15).

The configuration of on-board systems (step S 17) comprises the distribution of the fuel to the fuel tanks of the aircraft, the cooling output, the electricity consumption in the cabin, and the functionality of the flight management system (step S 18). The system configuration data is taken into account both in the advance calculation of the theoretical value relating to the fuel consumption or the quantity of fuel required (step S 13), and in the introduction of measures for saving fuel by means of the fuel management system (step S 15).

In step S 14 an actual practical value relating to the fuel consumption is determined. The practical value is compared with the theoretically predetermined value. When the practical value differs from the theoretical value by a predetermined amount, in step S 15 measures for saving fuel are initiated.

In step S 16 a quantity of fuel that is actually present on board at the time is determined in order to additionally enhance flight safety. The fuel management system can, for example, determine whether the actual on-board fuel quantity at the time is sufficient for the remaining flight distance at the actual fuel consumption.

By means of the precisely determined payload, in step S 11 some large consumers on board can thus be optimised (step S 17). This includes the galleys in which the electrical power required, for example for hot or cold beverages and meals, can be adjusted accordingly. The in-flight entertainment (IFE) system is a further system. Finally, the air conditioning system plays an important role. For example, per passenger a heat output ranging between 60 and 90 watts is produced. The quantity of waste heat from the above-mentioned systems from entertainment and from the galleys also depends on the number of passengers on board; said waste heat can be utilised for optimum configuration of the air conditioning system.

By means of the measures presented, the fuel consumption during normal operation can thus be minimized. However, options for reducing fuel consumption during the flight are also provided. This can become necessary in cases where the fuel consumption is greater than planned and may exceed a predetermined critical differential value. In this case a message can be sent to the cockpit, where subsequently suitable measures can be taken in order to reduce the fuel consumption.

Figure 4:
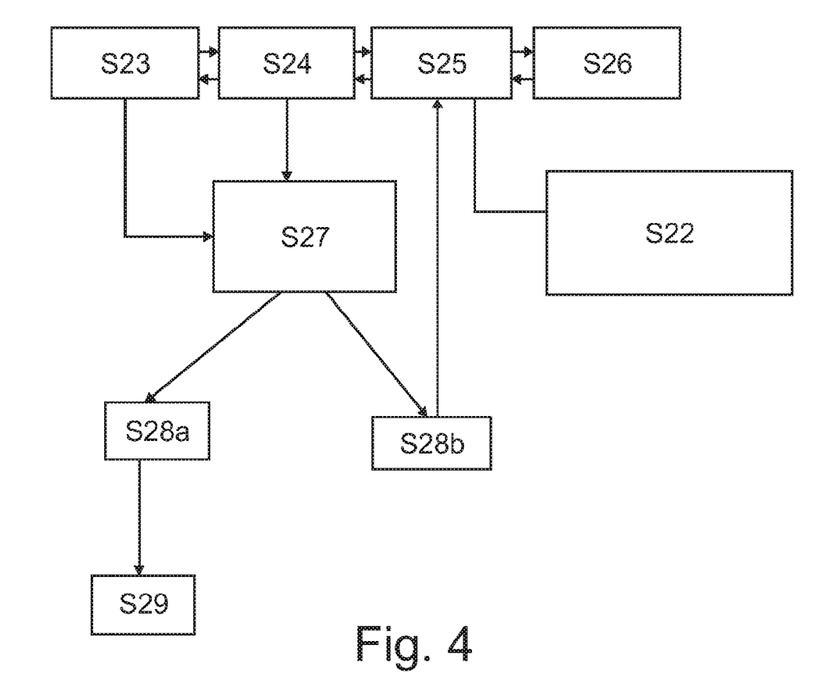
FIG. 4 diagrammatically shows the function of the fuel management system according to the invention during a flight.

FIG. 4 diagrammatically shows the function of a fuel management system according to the invention during a flight. Analogously to the steps (S 13 to S 16) shown in FIG. 3, the fuel management system determines the theoretical value relating to the fuel consumption (step S 23), the actual practical value relating to the fuel consumption (step S 24), the quantity of fuel that is actually present on board at the time (step S 26) and the necessity of introducing measures for saving fuel (step S 25).

In step 27 the theoretical value relating to the fuel consumption is subtracted from the actually measured or determined value relating to the fuel consumption. Depending on the size of this difference, in step S 28 a case differentiation takes place: if the differential amount is below a permissible threshold value (step S 28a), then no particular measures are initiated and the flight continues unchanged (step S 29). If the differential amount exceeds a permissible threshold value (step 28b), then measures for saving fuel are provided (step S 25). In step S 22 the measures for saving fuel are provided to the aircrew as a list, or alternatively are automatically initiated by the fuel management system. Possible measures of this type include a reduction in the cruising speed; operating the air conditioning unit and/or the electrical energy supply system in an economy mode; and/or changing flight parameters, for example the flight altitude. These measures are suitable for reducing the fuel consumption and for returning it to the predetermined tolerance range.

In relation to particular aircraft types, for example extended twin engine operations (ETOPS), special considerations may apply in the determination of the quantity of fuel to be carried on board, in other words in relation to the theoretical value prior to departure. For example, the quantity of fuel carried on board must take into account diversions (diversion airports) and continuation of the flight at a lower flight altitude, for example at 10,000 feet, following decompression. If at the intended flight altitude there are mountains or other obstacles, it can be advantageous as a measure for saving fuel to be able to switch the emergency oxygen supply system on and off. This can, for example, take place by way of a programmable pressure switch, also referred to as an "enhanced altitude pressure switch". In this way it may be possible to consider shorter routes in mountainous terrain as diversion routes, which can result in a reduction in the overall quantity of fuel that is to be carried on board.

Lastly, it should be noted that terms such as "comprising" or similar do not exclude the possible provision of other elements or steps. Furthermore, it should be pointed out that "a" or "one" does not exclude a plural number. Moreover, characteristics which have been described in conjunction with the various embodiments can be combined as desired. Furthermore, it should be noted that reference characters in the claims are not to be interpreted as limiting the scope of the claims.

The invention claimed is:

1. A computer-implemented fuel management method for monitoring and minimizing a fuel consumption of an aircraft, comprising:
   determining, on the basis of model assumptions, a theoretical value of a first quantity of fuel that is necessary for travelling along at least one sector of a flight route, the first quantity of fuel comprising one or more of a quantity of fuel required for taxiing of the aircraft, a quantity of fuel required for travelling along the at least one sector of the flight route of the aircraft, and a quantity of fuel required for contingency;
   determining a practical value of a second quantity of fuel that is necessary for travelling along a remaining flight distance of the at least one sector of the flight route, taking into account a plurality of actual measured values;
   comparing the theoretical value of the first quantity of fuel with the practical value of the second quantity of fuel; and
   providing at least one measure in order to save fuel during the flight when the practical value of the second quantity of fuel differs from the theoretical value of the first quantity of fuel by a predeterminable amount;
   wherein the at least one measure for saving fuel during the flight comprises reduction of the energy consumption of at least one on-board system;
   wherein the at least one measure is provided by a fuel management system.

2. The fuel management method of claim 1,
   wherein the plurality of actually measured values comprise at least one measured value from the following group: a quantity of fuel that is actually present on board at the time, and an actual fuel consumption at the time.

3. The fuel management method of claim 1,
   wherein providing the at least one measure for saving fuel during the flight comprises generating a signal;
   wherein the signal is transmitted to an aircrew; and
   wherein the signal lists proposals of at least one measure in order to save fuel during the flight.

4. The fuel management method of claim 1,
   wherein the at least one measure for saving fuel during the flight further comprises at least one measure from the following group: optimization of flight parameters; and transfer pumping fuel in order to optimise the center of gravity of the aircraft.

5. The fuel management method of claim 1,
   further comprising determining the center of gravity of the aircraft;
   wherein the center of gravity that has been determined is used in the determination of the theoretical value; and
   wherein during the determination of the center of gravity at least one of the following characteristics is taken into account: number, distribution and weight of objects in the aircraft.

6. The fuel management method of claim 5,
   further comprising determining the characteristic of distribution of the objects in the aircraft by signal transmission during the fastening of seat belts.

7. The fuel management method of claim 5,
   further comprising determining the characteristic of the weight of the objects by sensors that are integrated in aircraft seats.

8. The fuel management method of claim 5,
   further comprising determining at least one of the characteristics of the weight and of the distribution of the objects by way of RFID tags arranged on the objects.

9. The fuel management method of claim 5,
wherein the at least one measure to save fuel during flight uses data relating to the determined center of gravity of the aircraft in order to optimize the center of gravity of the aircraft by transfer pumping fuel.

10. A computer readable medium having instructions for monitoring and minimizing a fuel consumption during the flight of an aircraft, wherein execution of the instructions causes a processor of a fuel management system to:
  determine a theoretical value of a first fuel quantity that is necessary for travelling along at least one sector of a flight route, based on model assumptions, the first quantity of fuel comprising one or more of a quantity of fuel required for taxiing of the aircraft, a quantity of fuel required for travelling along the at least one sector of the flight route of the aircraft, and a quantity of fuel required for contingency;
  determine a practical value of a second quantity of fuel that is necessary for travelling along a remaining flight distance of the at least one sector of the flight route, taking into account a plurality of actual measured values;
  compare the theoretical value of the first quantity of fuel with the practical value of the second quantity of fuel; and
  provide at least one measure to save fuel during the flight when the practical value of the second quantity of fuel differs from the theoretical value of the first quantity of fuel by a predeterminable amount;
  wherein the at least one measure for saving fuel during the flight comprises reduction of the energy consumption of at least one on-board system.

11. A computer system for monitoring and minimizing a fuel consumption during the flight of an aircraft, the system comprising a processor programmed to:
  determine a theoretical value of a first fuel quantity that is necessary for travelling along at least one sector of a flight route, based on model assumptions, the first quantity of fuel comprising one or more of a quantity of fuel required for taxiing of the aircraft, a quantity of fuel required for travelling along the at least one sector of the flight route of the aircraft, and a quantity of fuel required for contingency;
  determine a practical value of a second quantity of fuel that is necessary for travelling along a remaining flight distance of the at least one sector of the flight route, taking into account a plurality of actual measured values;
  compare the theoretical value of the first quantity of fuel with the practical value of the second quantity of fuel; and
  provide at least one measure to save fuel during the flight when the practical value of the second quantity of fuel differs from the theoretical value of the first quantity of fuel by a predeterminable amount;
  wherein the at least one measure for saving fuel during the flight comprises reduction of the energy consumption of at least one on-board system;
  wherein the computer system is a fuel management system.

12. The computer system of claim 11, wherein the processor is disposed within the aircraft.

* * * * *